United States Patent
Hu

(10) Patent No.: US 10,298,845 B2
(45) Date of Patent: May 21, 2019

(54) IMAGE-CAPTURE SYSTEM

(71) Applicant: TDK TAIWAN CORP., Yangmei Taoyuan (TW)

(72) Inventor: Chao-Chang Hu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 0 days.

(21) Appl. No.: 14/831,390

(22) Filed: Aug. 20, 2015

(65) Prior Publication Data

US 2016/0269638 A1 Sep. 15, 2016

(30) Foreign Application Priority Data

Mar. 13, 2015 (TW) .............................. 104108023 A

(51) Int. Cl.
*G03B 17/00* (2006.01)
*H04N 5/232* (2006.01)

(52) U.S. Cl.
CPC ..... *H04N 5/23258* (2013.01); *H04N 5/23287* (2013.01)

(58) Field of Classification Search
CPC ......... G03B 17/00; H04N 5/228; G02B 27/64
USPC .................. 396/55; 348/208.11; 359/557
See application file for complete search history.

(56) References Cited

U.S. PATENT DOCUMENTS

| 2004/0057711 A1* | 3/2004 | Ogg ..................... G02B 7/04 396/81 |
| 2006/0272440 A1* | 12/2006 | Mori ..................... G02B 7/102 74/473.12 |
| 2011/0013895 A1* | 1/2011 | Chiang .................. G03B 17/00 396/55 |
| 2011/0063458 A1* | 3/2011 | Washisu .................. G03B 5/00 348/208.2 |

FOREIGN PATENT DOCUMENTS

| JP | 09-080542 A | 3/1997 |
| JP | 2003-091028 A | 3/2003 |
| JP | 2008-067177 A | 3/2008 |
| JP | 2009-042369 A | 2/2009 |
| WO | WO 2013085355 A1 * | 6/2013 ............... G03B 5/00 |

OTHER PUBLICATIONS

Office Action dated Sep. 27, 2016 in corresponding Japanese Patent Application No. 2016-039145 (4 pages).

* cited by examiner

*Primary Examiner* — Clayton E. LaBalle
*Assistant Examiner* — Fang-Chi Chang
(74) *Attorney, Agent, or Firm* — Muncy, Geissler, Olds & Lowe, P.C.

(57) ABSTRACT

An image-capture system is provided. The image-capture system includes a lens, a motor, a first sensing unit, and a control unit. The lens has an effective focal length. The motor carries the lens and adjusts a position of the lens according to a driving signal. The first sensing unit senses a shaking amount of the image-capture system and generates a first sensing signal. The control unit provides the driving signal according to predetermined information and the first sensing signal.

13 Claims, 5 Drawing Sheets

IMAGE-CAPTURE SYSTEM

CROSS REFERENCE TO RELATED APPLICATIONS

This application claims priority of Taiwan Patent Application No. 104108023, filed on Mar. 13, 2015, the entirety of which is incorporated by reference herein.

BACKGROUND OF THE INVENTION

Field of the Invention

The invention relates to an image-capture system, and more particularly to an image-capture system with a lens.

Description of the Related Art

As technology advances, there are more and more types of electronic products, each of which has more and more functions. Some small, thin electronic products such as smartphones are equipped with cameras, and these electronic products may shake due to excessive force occurring when shutter buttons are pressed by users, resulting in unclear images.

BRIEF SUMMARY OF THE INVENTION

An exemplary embodiment of an image-capture system is provided. The image-capture system comprises a lens, a motor, a first sensing unit, and a control unit. The lens has an effective focal length. The motor carries the lens and adjusts a position of the lens according to a driving signal. The first sensing unit senses a shaking amount of the image-capture system and generates a first sensing signal. The control unit provides the driving signal according to predetermined information and the first sensing signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
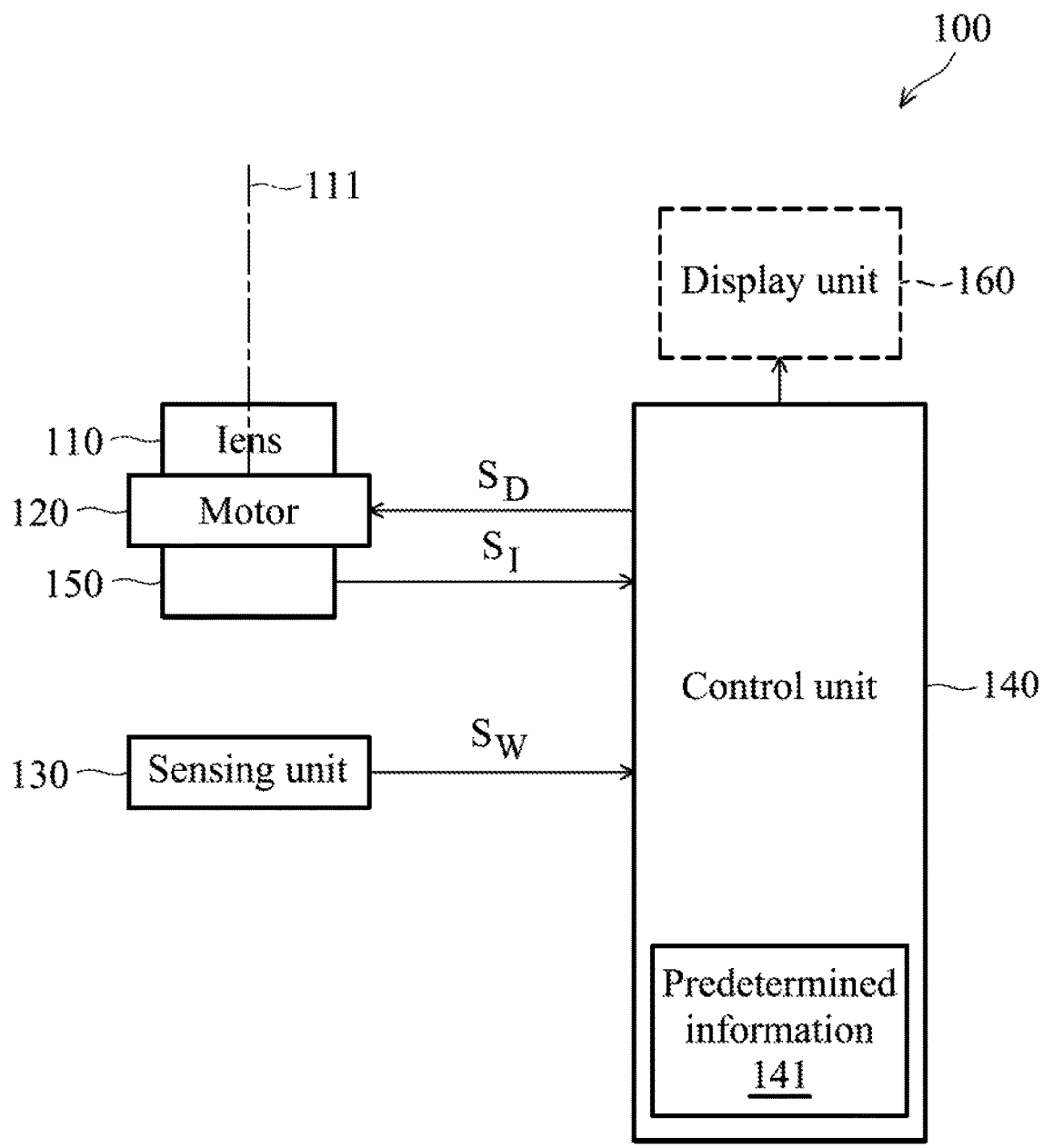
FIG. 1 shows one exemplary embodiment of an image-capture system.

FIG. 1 shows one exemplary embodiment of an image-capture system. As shown in FIG. 1, an image-capture system 100 comprises a lens 110, a motor 120, a sensing unit 130, and a control unit 140. In an embodiment, the image-capture system 100 is implemented by a portable electronic device, such as a smartphone, but the disclosure is not limited thereto. In other embodiments, any system with a lens can be configured as the image-capture system 100. In the embodiment, the image-capture system 100 has an anti-shake function.

The lens 110 is disposed on the motor 120, and there is an axis 111 that corresponds to the lens 110. In the embodiment, there is an effective focal length (EFL) between an image-sensing element 150 and the optical center point of the lens 110. The image-sensing element 150 generates an image signal $S_1$ according to light passing through the lens 110. In an embodiment, the image-capture system 100 further comprises a display unit 160 which displays a frame according to the image signal $S_1$. The invention does not limit the type of image-sensing element 150. In an embodiment, the image-sensing element 150 is a charge-coupled device (CCD) or a complementary metal-oxide semiconductor (CMOS).

The motor 120 carries the lens 100 and moves the lens 110 according to a driving signal $S_D$. In the embodiment, the motor 120 causes the lens 110 to move on a plane, wherein the plane is vertical to the axis 111. The invention does not limit the manner in which the lens moves. In some embodiments, the motor 120 leads the lens 110 to move in any direction on the plane. In an embodiment, the driving signal $S_D$ is a current. In the embodiment, the motor 120 is implemented by a linear motor. However, the invention does not limit the structure of the motor 120. One motor which is capable of driving the lens 110 to move on a plane can be configured as the motor 120. In an embodiment, the motor 120 is implemented by an electromagnetic motor. In another embodiment, when the lens is affected by the gravity force (such as Gravity) and then shifts, the shifted disposition of the lens 120 is within a tolerate range through the operation of the motor. The tolerate range is defined by a manufacturer manufacturing the image-capture system 100.

Figure 2:
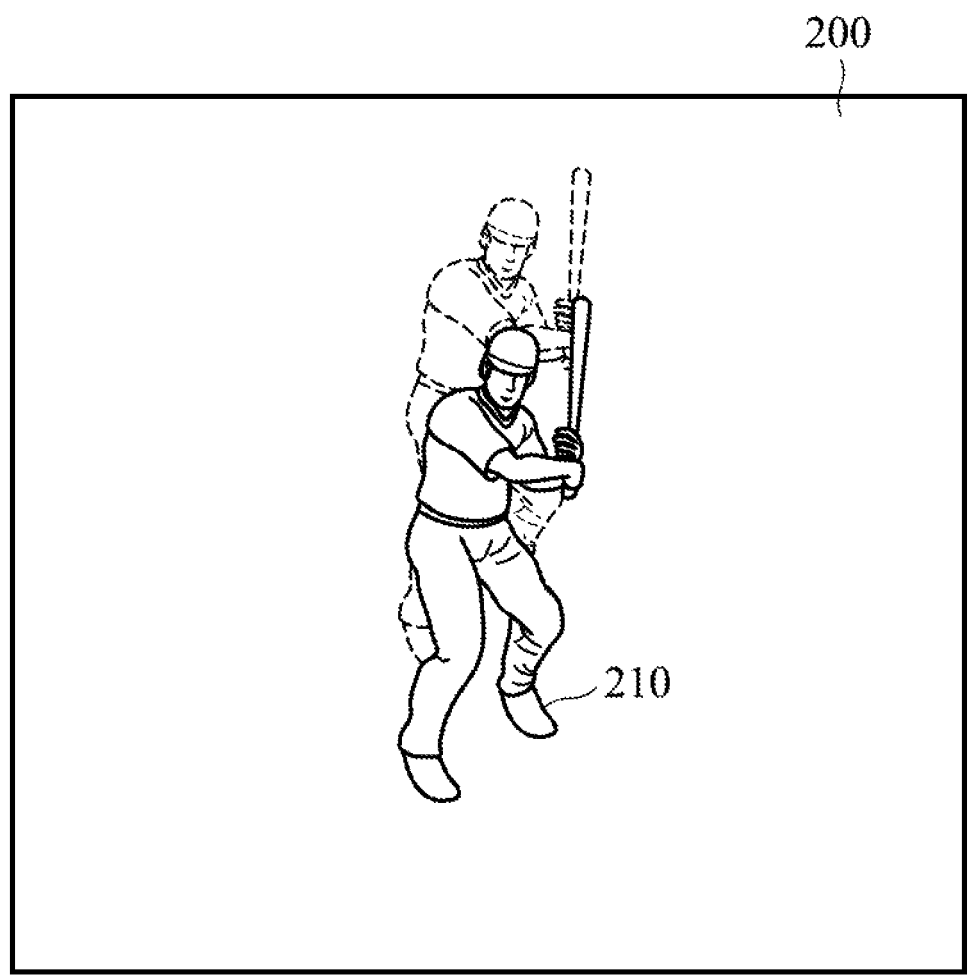
FIG. 2 is a schematic diagram of a frame.

In the embodiment, when the image-capture system 100 shakes due to external force, the motor 120 leads the lens 110 to move in a relative direction, which can compensate for the image shifting caused by the shaking of the image-capture system 100. Referring to FIG. 2, the frame 200 is a frame displayed on the display unit 160. It is assumed that the image 210 is substantially disposed on the center of the frame 200 when the image-capture system 100 does not shake. When the image-capture system 100 shakes due to an external force (for example, the image-capture system 100 leaning forward), the images on the frame 200 will shift upward, as indicated by dotted lines in FIG. 2. At this time, the motor 120 needs to lead the lens 110 to move upward so as to compensate for the image shifting caused by the forward leaning of the image-capture system 100.

The sensing unit 130 senses the shaking amount of the image-capture system 100 to generate a first sensing signal $S_W$. The invention does not limit the type of sensing unit 130. In an embodiment, the sensing unit 130 comprises at least one gyro sensor, but the disclosure is not limited thereto. In other embodiments, one sensor which is capable of sensing the shaking amount of the image-capture system 100 can be applied in the sensing unit 130.

The control unit 140 provides the driving signal $S_D$ according to predetermined information 141 and the first sensing signal $S_W$. In the embodiment, the predetermined information 141 is the sensitivity information of the motor 120, which is the relationship between the movement distance by which the motor 120 leads the lens 110 and of the current. For example, the sensitivity information of the motor 120 is 1.5 um/mA, which represents that the motor 120 leads the lens 110 to move by 1.5 um when a current of 1 mA is applied.

The control unit 140 obtains the shaking amounts of the image-capture system 100 in various directions according to the first sensing signal $S_W$. The control unit 140 performs an operation for the shaking amounts of the image-capture system 100 and the effective focal length to obtain a compensation stroke, which is how much distance the motor 120 needs to move the lens 110 just for compensating for the shaking amounts of the image-capture system 100. Thus, a current value can be obtained by dividing the compensation stroke by the sensitivity information of the motor 120. By providing the driving signal $S_D$ to the motor 120 according to the current value, the motor 120 can move lens 110 for compensating for the shaking amounts of the image-capture system 100. For example, in cases where the control unit 140 performs an operation to the shaking amounts of the image-capture system 100 and the effective focal length to obtain an operation result of 30 um, 30 um divided by 1.5 um/mA is equal to 20 mA. Thus, the shaking amounts of the image-capture system 100 can be compensated for as long as a current of 20 mA is provided to the motor 120.

Figure 3A:
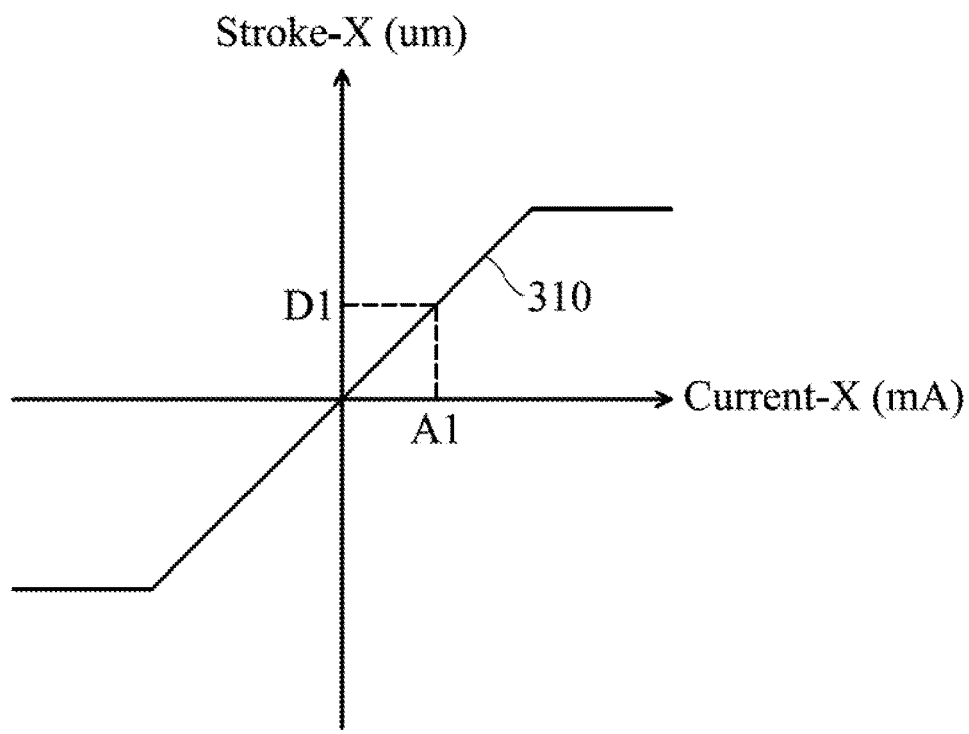
FIGS. 3A and 3B show one embodiment of sensitivity information of the motor.
Figure 3B:
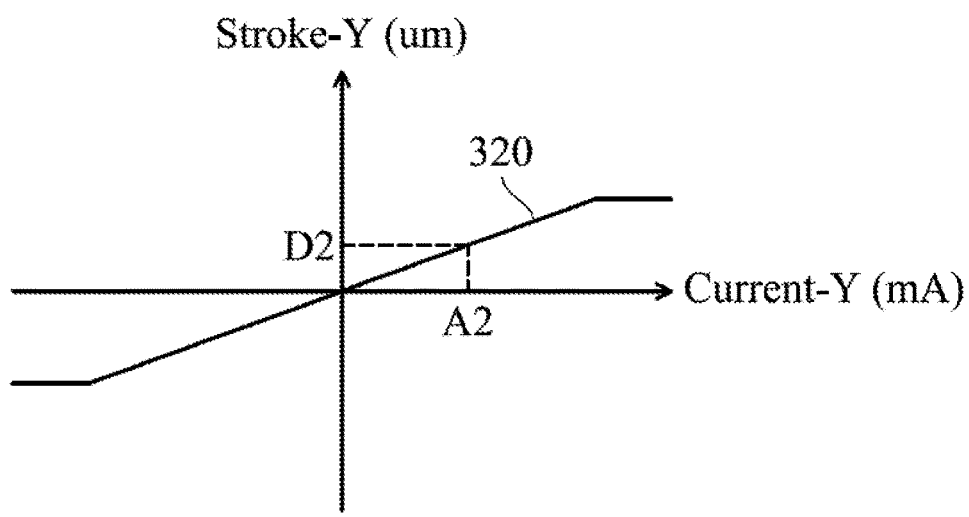

FIGS. 3A and 3B show one embodiment of the sensitivity information of the motor. Referring to FIG. 3A, the curve 310 indicates the compensation stroke-current relationship that exists when the motor 120 leads the lens 110 to move in a first direction. The compensation stroke-current relationship of the curve 310 is used for compensating for the shaking of the image-capture system 100 in the first direction. For example, in the case where the image-capture system 100 slightly turns toward the left side, the motor 120 can lead the lens 110 move toward the right side by the distance D1 as long as a current A1 is provided to the motor 120.

In FIG. 3B, the curve 320 indicates the compensation stroke-current relationship that exists when the motor 120 leads the lens 110 to move in a second direction. The compensation stroke-current relationship of the curve 30 is used for compensating for the shaking of the image-capture system 100 in the second direction. Taking the embodiment of FIG. 2 as an example, when the image-capture system 100 slightly leans forward, the image 210 shifts upward, as indicated by dotted lines. At this time, the motor 120 can lead the lens 110 move upward by the distance D2 as long as a current A2 is provided to the motor 120. Accordingly, the image which has shifted upward is pulled to the right center of the frame 200 (referring to the image 210).

The curves 310 and 320 indicate the compensation stroke-current relationship that exists when the motor 120 leads the lens 110 to move in different directions. The invention does not limit the relationship between the curves 310 and 320. In an embodiment, the slope of the curve 310 may be the same as or different from the slope of the curve 320.

In the embodiment, the control unit 140 obtains the movement distance of the image-capture system 100 according to the first sensing signal $S_W$ and the effective focal length and then calculates the driving signal $S_D$ according to the movement distance of the image-capture system 100 and the predetermined information 141 for compensating the image shifting caused by the shaking of the image-capture system 100. The embodiment of FIG. 2 is taken as an example. When the image-capture system 100 leans forward, the image 210 will shift upward (as represented by the dotted lines). At this time, the control unit 140 leads the lens 110 to move upward according to the first sensing signal $S_W$ and the predetermined information 141. Thus, the image shifts back to the center of the frame 200 (referring to the image 210). Similarly, when the image-capture system 100 turns toward the right side, the image 210 will shift toward the left side. At this time, the control unit 140 leads the lens 110 to move toward the left side according to the first sensing signal $S_W$ and the predetermined information 141. Through leading the lens 110 to move on a plane by the motor 120, the image shifting caused when the image-capture system 100 shakes can be compensated for.

The following shows the calculation of the compensation stroke of the motor 120 when the image-capture system 100 shakes in the first direction.

$$\text{stroke}_Y = \text{EFL} \cdot \tan \theta_X \qquad \text{Equation (1)}$$

$\theta_X$ is the calculation result which is obtained, by the control unit 140, according to the first sensing signal $S_W$ sensed by the sensing unit 130, wherein the calculation result is the angle by which the image-capture system 100 shakes in the first direction. EFL is the effective focal length of the lens 110. $\text{stroke}_Y$ is the compensation stroke of the motor 120.

The compensation stroke $\text{stroke}_Y$ of the motor 120 is obtained according to the Equation (1) for compensating for the shaking of the image-capture system 100 in the first direction. The control unit 140 obtains the current corresponding to the compensation stroke $\text{stroke}_Y$ (such as the current A2) according to the predetermined information (as shown in FIG. 3B). When the motor 120 receives the current A2, the motor 120 leads the lens 110 to move in the first direction by the distance D2 for compensating for the shaking of the image-capture system 100 in the first direction.

The following shows the calculation of the compensation stroke of the motor 120 when the image-capture system 100 shakes in the second direction.

$$\text{stroke}_X = \text{EFL} \cdot \tan \theta_Y \qquad \text{Equation (2)}$$

$\theta_Y$ is the calculation result which is obtained, by the control unit 140, according to the first sensing signal $S_W$ sensed by the sensing unit 130, wherein the calculation result is the angle by which the image-capture system 100 shakes in the second direction. EFL is the effective focal length of the lens 110. $\text{stroke}_X$ is the compensation stroke of the motor 120.

The compensation stroke $\text{stroke}_X$ of the motor 120 is obtained according to the Equation (2). The control unit 140 then obtains the current corresponding to the compensation stroke $\text{stroke}_X$ (such as the current A1) according to the predetermined information (as shown in FIG. 3A). When the motor 120 receives the current A1, the motor 120 leads the lens 110 to move in the second direction by the distance D1 for compensating for the shaking of the image-capture system 100 in the second direction.

In the embodiment, the control unit 140 stores the predetermined information previously. The control unit 140 can provide an appropriate driving signal to the motor 120 just according to the sensing result of the sensing unit 130 for compensating for the image shifting caused by the shaking of the image-capture system 100. Thus, Hall elements are not required to be disposed around the motor 120, which reduces the cost and decreases the area of the motor 120.

In an embodiment, the predetermined information is previously stored in the control unit 140. The designer previously stores predetermined information corresponding to specifications of various motors into the control unit 140. For example, the designer previously stores the sensitivity information of 1.5 um/mA of the motor into the control unit 140. The sensitivity information of 1.5 um/mA indicates that each time the current of 1 mA is provided to the motor 120, the motor 120 leads the lens 110 to move by 1.5 um. Thus, when the control unit 1401 realizes, according to the first sensing signal $S_W$, that the image-capture system 100 leans and the image thus will shift upward, the control unit 140 provides the current of 20 mA to the motor 120 to lead the lens to move upward by 30 umn. Similarly, when the image-capture system 100 turns toward the right side and the image thus shifts toward the left side, the control unit 140 provides the current of 20 mA to the motor 120 to lead the lens to move toward the left side by 30 umn.

In the above embodiments, a current of 20 mA is provided to the motor, but the disclosure is not limited thereto. Due to several windings disposed in the motor, when an appropriate current is provided to the corresponding winding(s), the direction in which the motor leads the lens 110 to move. In the embodiment, the structure of the motor is not limited. The motor which is capable of leading the lens 110 to move on a plane can be applied in the invention. In an embodiment, the motor 120 is implemented by an electromagnetic motor.

Figure 4:
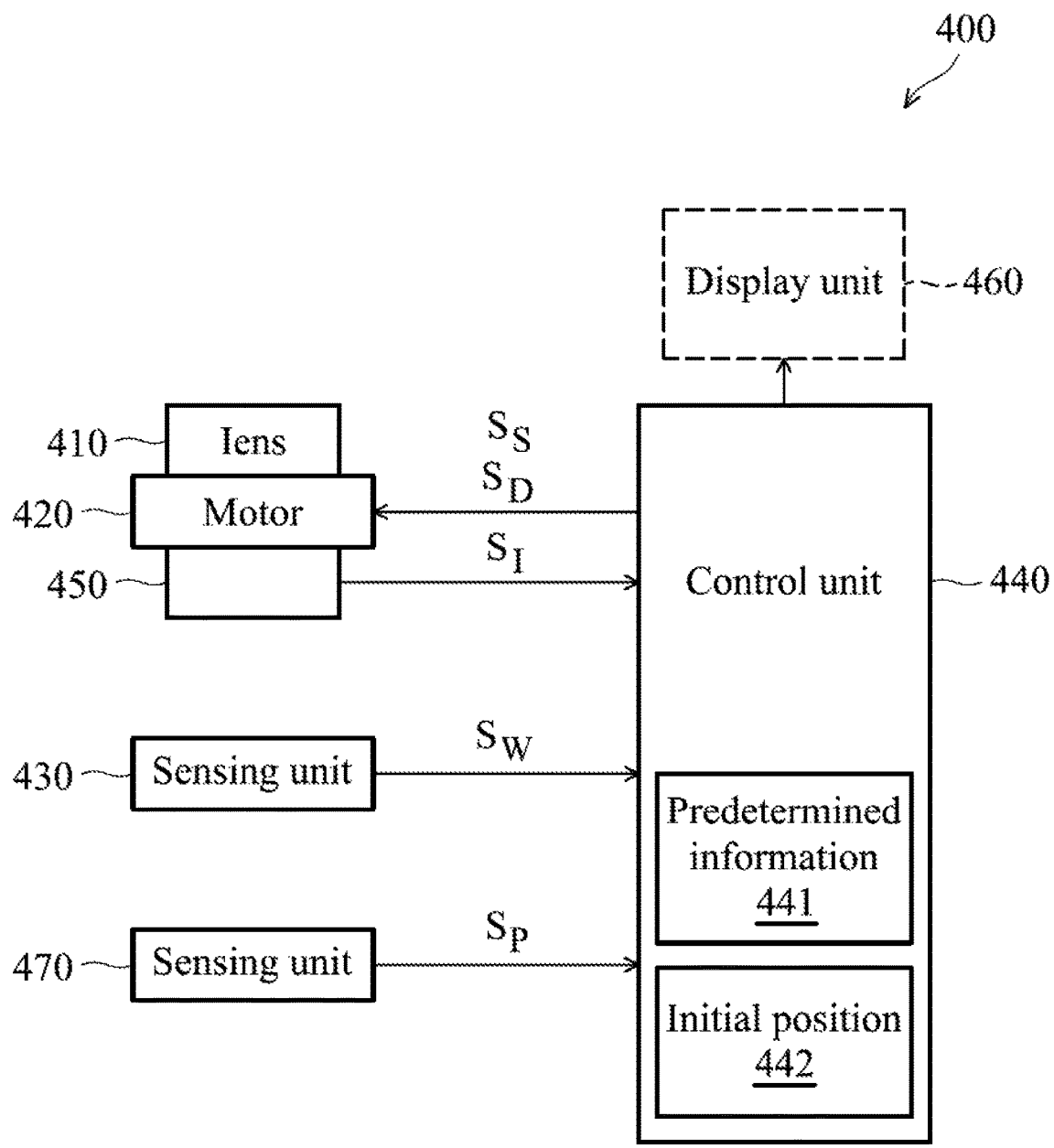
FIG. 4 shows another exemplary embodiment of the image-capture system.

FIG. 4 shows another exemplary embodiment of an image-capture system. The embodiment of FIG. 4 is almost similar to the embodiment of FIG. 1. The difference between the embodiments of FIGS. 1 and 4 is that the image-capture system of FIG. 4 further comprises a sensing unit 470 which is capable of sensing the degree of the gravity effect on the lens 410. Since the operations and features of a lens 410, a motor 420, a sensing unit 430, an image-sensing element 450, and a display unit 460 shown in FIG. 4 are the same as the operations and features of the lens 110, the motor 120, the sensing unit 130, the image-sensing element 150, and the display unit 160 shown in FIG. 1, the related description is omitted here.

Except the shaking occurring when the shutter button is pressed by the user, the lens 410 of the image-capture system 400 is affected by the gravity (such as Gravity) and then shifts. The gravity effect which the lens 410 suffers is varied with the different shifting directions of the lens 410, such as the heavenward direction, the direction toward the ground, or the direction toward the user. Thus, in the embodiment, the sensing unit 470 senses the degree of the gravity effect on the lens 410 and generates a second sensing signal $S_P$ to the control unit 440 for compensating for the gravity effect. The type of sensing unit 470 is not limited in the invention. In an embodiment, the sensing unit 470 is implemented by a gravity sensor (G sensor).

During an initial period, the control unit 440 generates an initial driving signal $S_S$ according to the difference between the sensing signal $S_P$ and an initial position 442 of the lens 410. The motor 420 moves the lens 410 according to the driving signal $S_S$ for compensating for the gravity effect. In an embodiment, the initial position 442 of the lens 410 is previously stored in the control unit 440. Then, during an operation period, the control unit 440 provides the driving signal $S_D$ according to the predetermined information 441 and the first and second sensing signals $S_W$ and $S_P$ for compensating for the image shifting caused by the shaking of the image-capture system 100 and for the gravity effect.

In an embodiment, if the control unit 440 does not compensate for the gravity effect on the lens 410 during the initial period when the lens 410 shifts due to the gravity effect, the control unit 440 only compensates for the shaking effect on the image-capture system 100 not for the gravity effect in the following operation period. In this embodiment, since the motor 420 can support the lens 410 in a position toleration range due to the support operation of the motor 420, the control unit 440 may not perform the compensation for the gravity effect.

In another embodiment, the control unit 440 compensates for the gravity effect on the lens 410 during the initial period. During the operation period, the control unit 440 the control unit 440 generates the driving signal $S_D$ according to not only the predetermined information 441 and the first sensing signal $S_W$ but also the sensing signal $S_P$ for further compensating for the gravity effect. In the embodiment, the control unit 440 compensates for the gravity effect and the shaking effect.

Figure 5A:
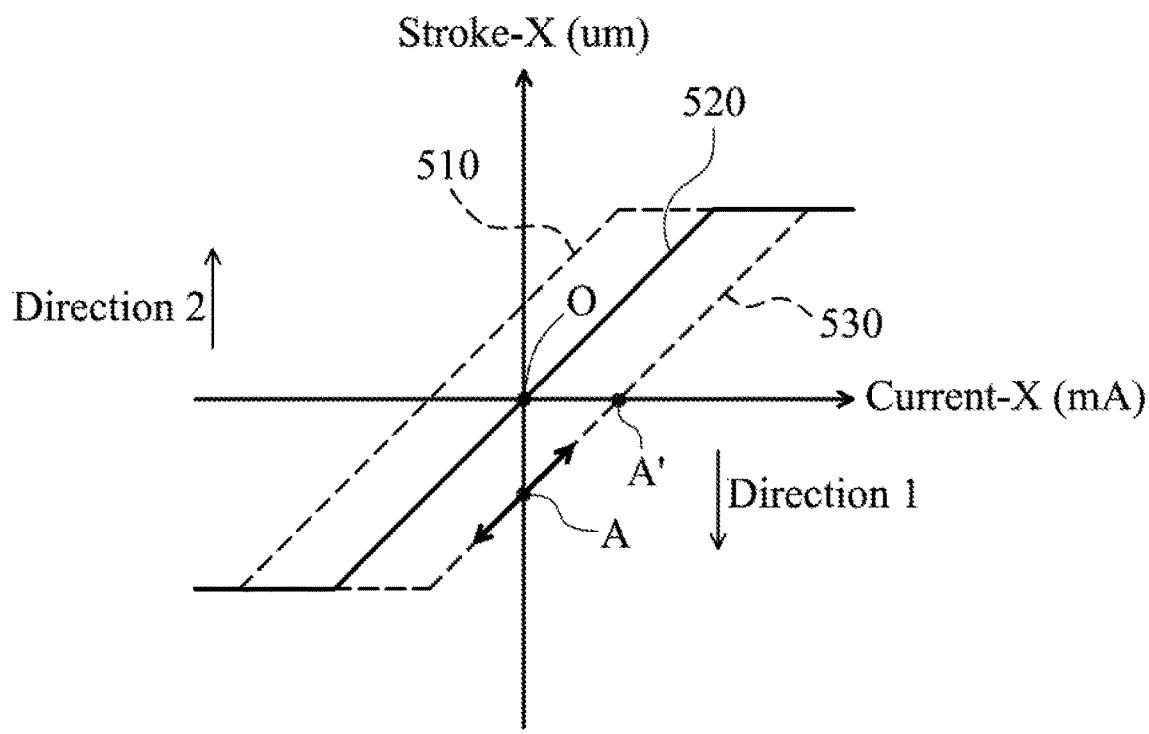
FIGS. 5A and 5B show another embodiment of the sensitivity information of the motor.
Figure 5B:
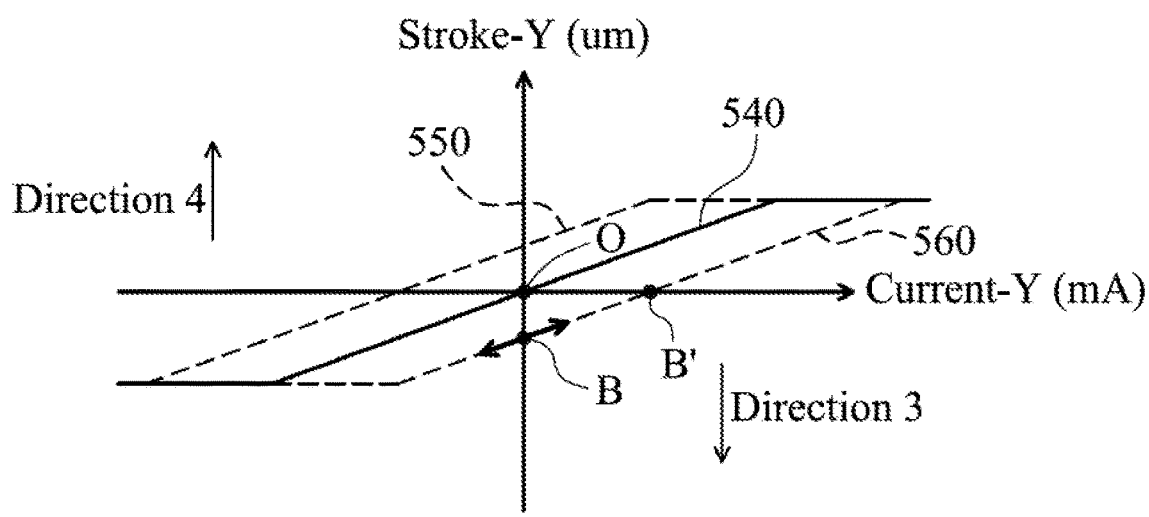

FIGS. 5A and 5B show another embodiment of the sensitivity information of the motor. In the embodiment, FIG. 5A is a schematic view showing one compensation stroke-current relationship for cases where the motor 120 leads the lens 110 to move in a first direction. The curve 520 indicates the compensation stroke-current relationship that exists when the lens 410 is not affected by the gravity. The curve 530 indicates the compensation stroke-current relationship that exists when the lens 410 is affected by the gravity in a direction 1. The curve 510 indicates the compensation stroke-current relationship that exists when the lens 410 is affected by the gravity in a direction 2.

In an embodiment, when the lens 410 is not affected by the gravity, the control unit 440 adjusts the position of the optical center point of the lens 410 according to the curve 520 for compensating for the shaking effect. When no current is applied to the motor 420, the optical center point of the lens 410 is at position O. When the lens 410 is affected by the gravity and the direction of the gravity is the direction 1, the lens 410 will move to position A.

In an embodiment, when the control unit 440 does not compensate for the gravity effect on the lens 410, the control unit 440 provides a current to the motor 420 according to the curve 530, such that the lens 410 moves in one of two different directions indicated by the arrows from position A. In another embodiment, when the control unit 440 performs a compensation for the gravity effect on the lens 410, the control unit 440 applies a current such that the lens 410 is moved to position A' from position A. After that, the control unit 440 then provides a current to the motor 420 according to the curve 530, such that the lens 410 moves in one of two different directions indicated by the arrows from position A'. In the case, the optical center point that exists when the lens 410 is disposed at position O corresponds to the optical center point that exists when the lens 410 is disposed at position A'. However, the lens 410 is not affected by the gravity when the lens 410 is disposed at position O, while the lens 410 is affected by the gravity when the lens 410 is disposed at position A' and the control unit 440 has performed the compensation for the gravity effect.

FIG. 5B is a schematic view showing another compensation stroke-current relationship when the gravity effect exists. The curve 540 indicates the compensation stroke-current relationship that exists when the motor 420 leads the lens 410 to move in the second direction in cases where the lens 410 is not affected by the gravity. The curve 560 indicates the compensation stroke-current relationship that exists when the lens 410 is affected by the gravity in a direction 3. The curve 550 indicates the compensation stroke-current relationship that exists when the lens 410 is affected by the gravity in a direction 4.

In an embodiment, when the lens 410 is not affected by the gravity, the control unit 440 adjusts the position of the optical center point of the lens 410 according to the curve 540 for compensating for the shaking effect. When no current is applied to the motor 420, the optical center point of the lens 410 is at position O. When the lens 410 is affected by the gravity and the direction of the gravity is the direction 3, the lens 410 will move to position B. At this time, when the gravity effect is not compensated for, the control unit 440 leads the lens 410 to move in one of two different directions indicated by the arrows from position B for compensating the shaking effect.

In another embodiment, when the control unit 440 performs the compensation for the gravity effect, the control unit 440 applies a current to the motor 420 and then the motor 420 leads the lens 410 to move to position B' from position B. Then, the control unit 440 applies another current to the motor 420 and then the motor 420 leads the lens 410 to move in one of two different directions indicated by the arrows from position B'.

By appropriately compensating for the compensation stroke of the motor, the shaking effect on the image-capture system 100 can be compensated for, thereby achieving an anti-shake function. Moreover, only by previously inputting the sensitivity information of the motor to the control unit can the control unit adjust the position of the lens by controlling the moving distance and direction of the lens by the motor according to the shaking amount of the image-capture system. Thus, the compensation amount which is required when the system shakes is fed back to compensate for the shifted images. According to the embodiments, the cost of the elements is decreased, and the compensation process is simplified.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-capture system comprising:
    a lens having an effective focal length;
    a motor carrying the lens and adjusting a position of the lens according to a driving signal, wherein:
        the motor is implemented by a linear motor,
        when the motor leads the lens to move in an active range, the current intensity of the driving signal and the movement distance by which the motor leads the lens are in direct proportion, and a linear relationship is between the current intensity of the driving signal and the movement distance by which the motor leads the lens,
        when no current is applied to the motor, the lens is at an initial position which is affected by gravity, and when the direction of the gravity is different, the initial position is different;
    a first sensing unit sensing a shaking amount of the image-capture system and generating a first sensing signal, wherein the first sensing unit is implemented by a gyro sensor;
    a second sensing unit sensing the direction of the gravity and generating a second sensing signal, wherein the second sensing unit is implemented by a gravity sensor (G sensor); and
    a control unit providing the driving signal according to predetermined information, the first sensing signal and the second sensing signal, wherein the predetermined, information comprises:
        initial position information comprising initial positions of the lens corresponding to the different directions of the gravity, respectively; and
        sensitivity information comprising a relationship between the movement distance by which the motor leads the lens and the current intensity of the driving signal,
    wherein the control unit generates a gravity compensation amount according to the second sensing signal and the initial position information, generates a shaking compensation amount according to the first sensing signal and the predetermined information and then generates the driving signal to the motor according to the gravity compensation amount and the shaking compensation amount, and
    wherein the image-capture system is devoid of a sensing unit configured to sense the change of the position of the lens.

2. The image-capture system as claimed in claim 1, wherein the driving signal is a current signal.

3. The image-capture system as claimed in claim 1, wherein the control unit obtains a stroke of the motor according to the first sensing signal and the effective focal length and then obtains the driving signal according to the stroke of the motor and the predetermined information.

4. The image-capture system as claimed in claim 1, wherein when the driving signal is a positive value, the motor leads the lens to move in a first direction, and when the driving signal is an negative value, the motor leads the lens to move in a direction opposite to the first direction.

5. The image-capture system as claimed in claim 4, wherein the first direction is different from an axis corresponding to the lens.

6. The image-capture system as claimed in claim 5, wherein the motor further leads the lens to move in a second direction different from the first direction.

7. The image-capture system as claimed in claim 6, wherein the motor comprises:
    a first winding driving the lens to move in the first direction; and
    a second winding driving the lens to move in the second direction,
    wherein the sensitivity information further comprises:
        a first sensitivity corresponding to the first winding; and
        a second sensitivity corresponding to the second winding, wherein the first sensitivity is different from the second sensitivity.

8. The image-capture system as claimed in claim 6, wherein the first direction is vertical to the second direction, and the second direction is vertical to the axis.

9. The image-capture system as claimed in claim 1, wherein the motor supports the lens in a positon toleration range due to a support operation of the motor.

10. The image-capture system as claimed in claim 1, wherein the predetermined information further comprises the effective focal length of the lens.

11. The image-capture system as claimed in claim 1, wherein when the direction of the gravity is changed, the active range is not changed.

12. The image-capture system as claimed in claim 1, wherein when the shaking of the image-capture system is in a first specific direction, the motor leads the lens to move in a second specific direction, and the second specific direction is opposite to the first specific direction.

13. The image-capture system as claimed in claim 1, wherein the image-capture system is devoid of a Hall elements configured to sense the change of the position of the lens or sense the shaking amount of the image-capture system.

\* \* \* \* \*